United States Patent
Horng

(10) Patent No.: US 7,884,513 B2
(45) Date of Patent: Feb. 8, 2011

(54) ROTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 77 days.

(21) Appl. No.: 12/343,639

(22) Filed: Dec. 24, 2008

(65) Prior Publication Data
US 2010/0133938 A1 Jun. 3, 2010

(30) Foreign Application Priority Data
Dec. 2, 2008 (TW) .............................. 97146745 A

(51) Int. Cl.
*H02K 7/00* (2006.01)
(52) U.S. Cl. ...................... 310/67 R; 310/90
(58) Field of Classification Search ............... 310/67 R, 310/90
See application file for complete search history.

(56) References Cited

U.S. PATENT DOCUMENTS

| | | | |
|---|---|---|---|
| 5,134,331 A * | 7/1992 | Miyaji et al. ................. 310/90 |
| 6,215,616 B1 * | 4/2001 | Phan et al. ............... 360/99.08 |
| 6,488,483 B1 | 12/2002 | Hsieh | |
| 6,512,316 B2 * | 1/2003 | Obara et al. ................... 310/90 |
| 6,544,011 B2 | 4/2003 | Hsieh | |
| 6,794,774 B2 * | 9/2004 | Obara et al. ............... 310/67 R |
| 6,841,902 B2 * | 1/2005 | Wang et al. ............... 310/67 R |
| 7,183,679 B2 * | 2/2007 | Liu ............................ 310/67 R |
| 7,317,271 B2 * | 1/2008 | Obata et al. ................... 310/90 |
| 2007/0188034 A1 * | 8/2007 | Yoshida ....................... 310/90 |
| 2007/0252464 A1 * | 11/2007 | Cheng ................... 310/156.06 |
| 2007/0257571 A1 * | 11/2007 | Hong et al. ............... 310/67 R |
| 2008/0007127 A1 * | 1/2008 | Hong et al. ................... 310/51 |

* cited by examiner

*Primary Examiner*—Thanh Lam
(74) *Attorney, Agent, or Firm*—Alan Kamrath; Kamrath & Associates PA

(57) ABSTRACT

A rotor includes a hub, a permanent magnet and a shaft. The hub has an inner surface and an outer surface, with an assembling hole being formed at the center of the inner surface. The permanent magnet is mounted on the inner surface of the hub. The shaft has two ends, with one end being a connecting end. The connecting end is fixed in the assembling hole of the hub. An extending member is arranged at the connecting end and extends radially from a radial surface of the shaft. The extending member is embedded in a wall of the hub. Consequently, a contact area between the hub and the shaft is radially extended and increased to provide a reliable combination of the hub and the shaft, and the rotor can be applied to a motor with minimizing dimensions.

14 Claims, 8 Drawing Sheets

ROTOR

BACKGROUND OF THE INVENTION

1. Field of the Invention

The present invention relates to a rotor and, more particularly, to a rotor that can be applied to a miniature motor.

2. Description of the Related Art

Each of FIGS. 1 and 2 shows a conventional rotor, with the two rotors of said drawings being similar. Referring to FIG. 1, a conventional rotor is designated as "9" and includes a hub 91, a permanent magnet 92 mounted on an inner and axially extended wall of the hub 91, and a shaft 93 (or 93' in FIG. 2) with two ends. A shaft seat 94 is formed on the center of and inside the hub 91. One end of the shaft 93 is a connecting end fixed to the shaft seat 94. Hence, the rotor 9 can be driven to revolve by a stator 82 while the other end of the shaft 93 rotatably extends through a bearing 81. It is noted that the major difference between rotors of FIGS. 1 and 2 is appearances of the connecting ends of the shaft 93 (seen in FIG. 1) and the shaft 93' (seen in FIG. 2)

In general, as shown in FIGS. 1 and 2, the connecting end of the shaft 93, 93' and the shaft seat 94 of the hub 91 are combined in two ways. One way is that the connecting end forms at least one concavity 95 (seen in FIG. 1), and the other way is that the connecting end forms impressed patterns 96 (seen in FIG. 2), with the connecting end of the shaft 93, 93' being securely inserted into the shaft seat 94. Thus, combination of the connecting end of the shaft 93, 93' and the shaft seat 94 is enhanced to prevent a departure of the shaft 93, 93' and the hub 91.

The current trend of research and development in electronic products is miniaturization, and that results in the necessity of minimizing dimensions of motors. However, with a length of the shaft 93, 93' being fixed, the rotor 9 will be liable to revolve unstably if the hub 91 has the shaft seat 94 or a thicker wall for receiving the connecting end of the shaft 93, 93' while a part of the shaft 93, 93' for coupling to the bearing 81 is shortened. On the other hand, if the part of the shaft 93, 93' for coupling to the bearing 81 is lengthened, contact area between the shaft 93, 93' and the hub 91 is reduced.

In conclusion, reduction of an axial height of the shaft seat 94 leads to reduced contact area between the shaft 93, 93' and the hub 91, which causes weakness in combination of the shaft 93, 93' and the hub 91. However, it is difficult to minimize dimensions of the motor without reduction of the axial height of the shaft seat 94. As a result, the conventional rotor 9 is not feasible for a miniature motor.

SUMMARY OF THE INVENTION

The primary objective of the present invention is to provide a rotor that solves the problems of the conventional rotor and allows a miniature design of a motor.

The second objective of the present invention is to provide the rotor, which improves combination of a hub and a shaft.

A rotor according to the preferred teachings of the present invention 10 includes a hub, a permanent magnet and a shaft. The hub has an inner surface and an outer surface, with an assembling hole being formed in the inner surface and at the center of the inner surface. The permanent magnet is mounted on the inner surface of the hub. The shaft has two ends, with one end being a connecting end. The connecting end is fixed in the assembling hole of the hub. An extending member is arranged at the connecting end and extends radially from a radial surface of the shaft, with the extending member being embedded in a wall of the hub.

Accordingly, a contact area between the hub and the shaft is radially extended and increased by the extending member mounted around the connecting end of the shaft. Also, a reliable combination of the hub and the shaft is still achieved, to prevent loosening of the shaft and to prevent departure of the shaft from the hub, even though the hub is without a shaft seat for the shaft to fix.

Furthermore, an axial height of the rotor is reduced, since there is no shaft seat formed on the hub. Accordingly, the rotor can be applied to a motor with minimizing dimensions.

Further scope of the applicability of the present invention will become apparent from the detailed description given hereinafter. However, it should be understood that the detailed description and specific examples, while indicating preferable embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
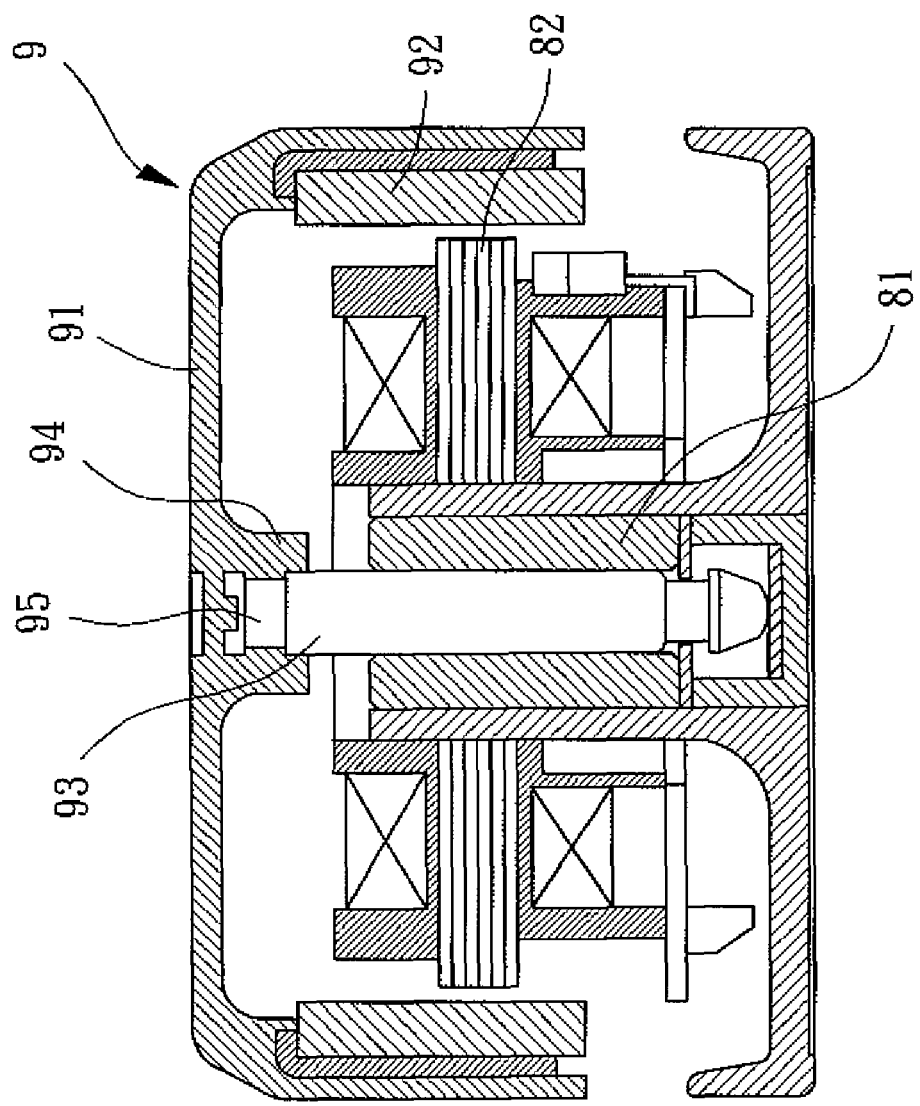
FIG. 1 is a cross sectional view illustrating a conventional rotor applied to a motor.
Figure 2:
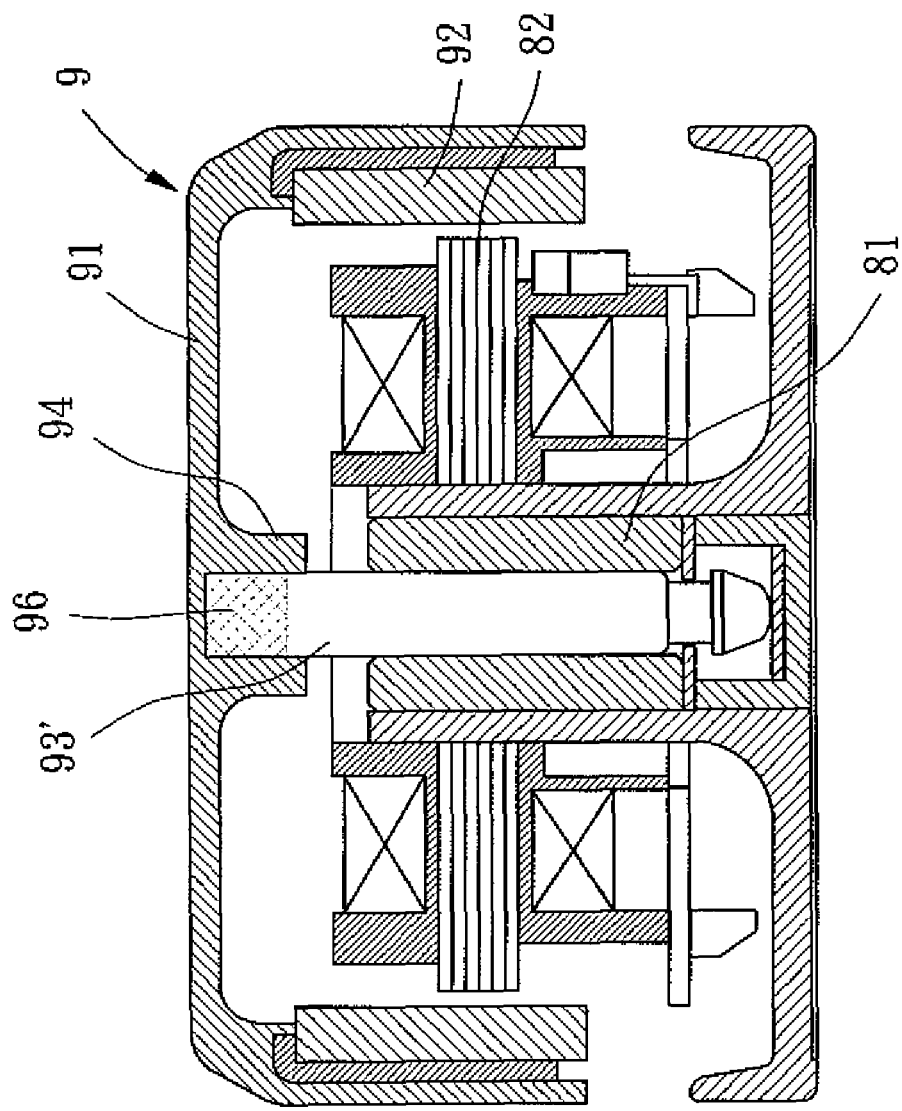
FIG. 2 is a cross sectional view illustrating another conventional rotor applied to a motor.

In the various figures of the drawings, the same numerals designate the same or similar parts. Furthermore, when the terms "first", "second", "annular", "axial", "radial", "outer", "inner", "section", "portion", "end", "lateral", "height", "upwards", "downward" and similar terms have used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 3:
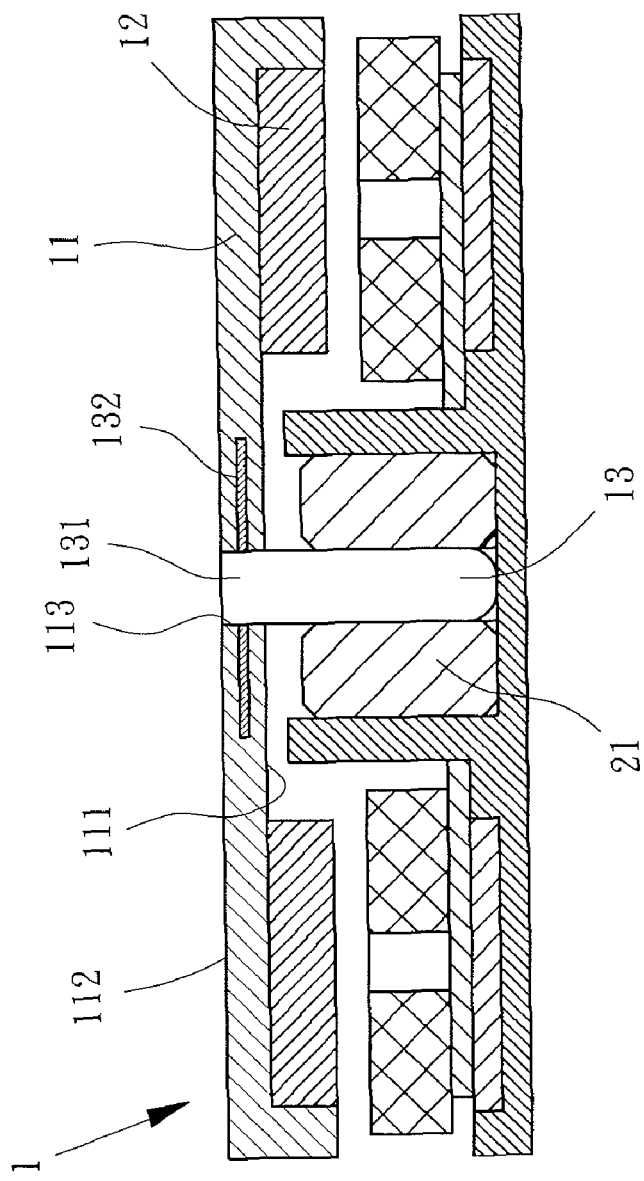
FIG. 3 is cross sectional view illustrating a rotor in accordance with a first embodiment of the present invention when the rotor is applied to a motor.

A rotor designated as "1" of a first embodiment according to the preferred teachings of the present invention is shown in FIG. 3 of the drawings. The rotor 1 includes a hub 11, a permanent magnet 12 and a shaft 13.

The hub 11 has an inner surface 111 and an outer surface 112 at two opposite sides of the hub 11. An assembling hole 113 is arranged at the center of the hub 11. Alternatively, the assembling hole 113 is a blind hole with an end thereof closed by the outer surface 112 (not illustrated), or the assembling hole 113 is a through hole passing through the hub 11 to connect with the inner surface 111 and the outer surface 112 (seen in FIG. 3).

The permanent magnet 12 is attached to the inner surface 111 of the hub 11 and surrounds the assembling hole 113.

Figure 4:
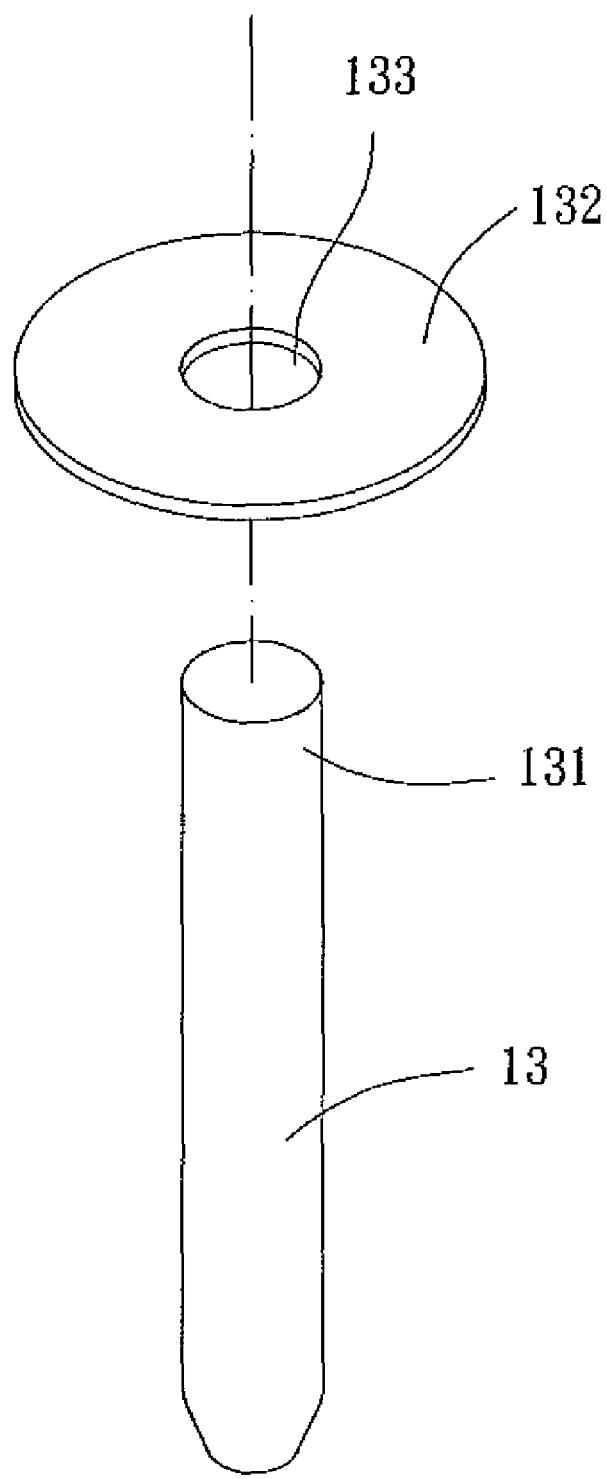
FIG. 4 is an exploded perspective view illustrating a shaft and an extending member of FIG. 3.
Figure 5:
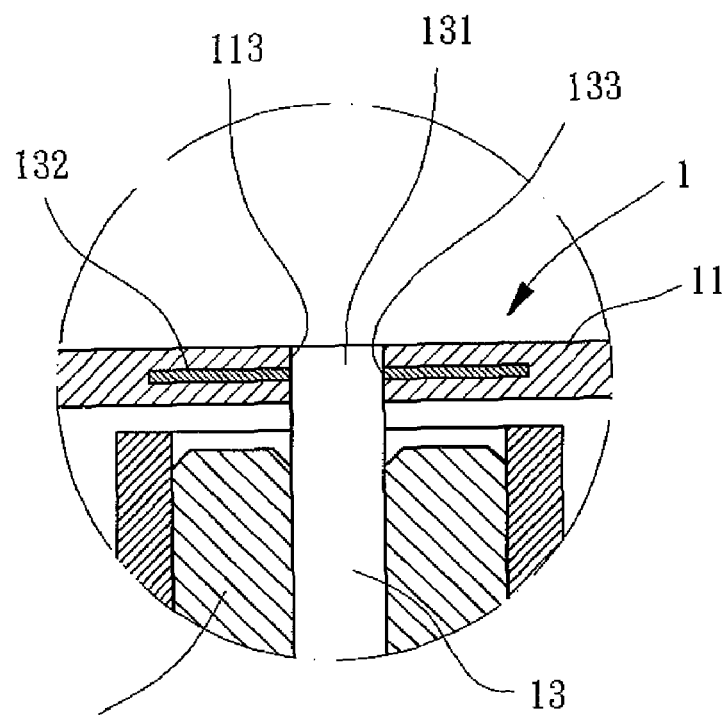
FIG. 5 an enlarged detailed cross sectional view illustrating where the shaft is fixed to a hub of FIG. 3.

Referring to FIGS. 3 to 5, the shaft 13 has two ends, with one end of the shaft 13 being a connecting end 131. The connecting end 131 is fixed in the assembling hole 113 of the hub 11 without projecting from the outer surface 112, with the other end of the shaft 13 being out of the assembling hole 113. Thus, the shaft 13 seems to stick out from the inner surface 111 of the hub 11. Furthermore, an extending member 132 is arranged at the connecting end 131 and extends radially from a radial surface of the shaft 13, with the extending member 132 being embedded in a wall of the hub 11. Preferably, the extending member 132 is an annular plate. Optionally, the extending member 132 is formed integrally around the connecting end 131 of the shaft 13, or the shaft 13 and the extending member 132 are two separate pieces with the connecting end 131 extending through a central hole 133 of the extending member 132 to securely couple to the extending member 132 (seen in FIG. 4). As FIG. 4 shown, the connecting end 131 partially passes through the central hole 133 and fixedly attaches to a periphery of the central hole 133 of the extending member 132.

Referring again to FIG. 3, the rotor 1 of the first embodiment according to the preferred teachings of the present invention can be applied to a miniature motor with an axial air gap. Also, the other end of the shaft 13 opposite to the connecting end 131 extends rotatably in a bearing 21 of the miniature motor.

By arrangement of the extending member 132, a contact area between the hub 11 and the shaft 13 is radially extended and increased. Therefore, even if the hub 11 is without a shaft seat to fix the shaft 13 or a wall thickness of the hub 11 is reduced, a reliable combination of the hub 11 and the shaft 13 is still achieved to prevent loosening of the shaft 13 and departure of the shaft 13 from the hub 11.

Figure 6:
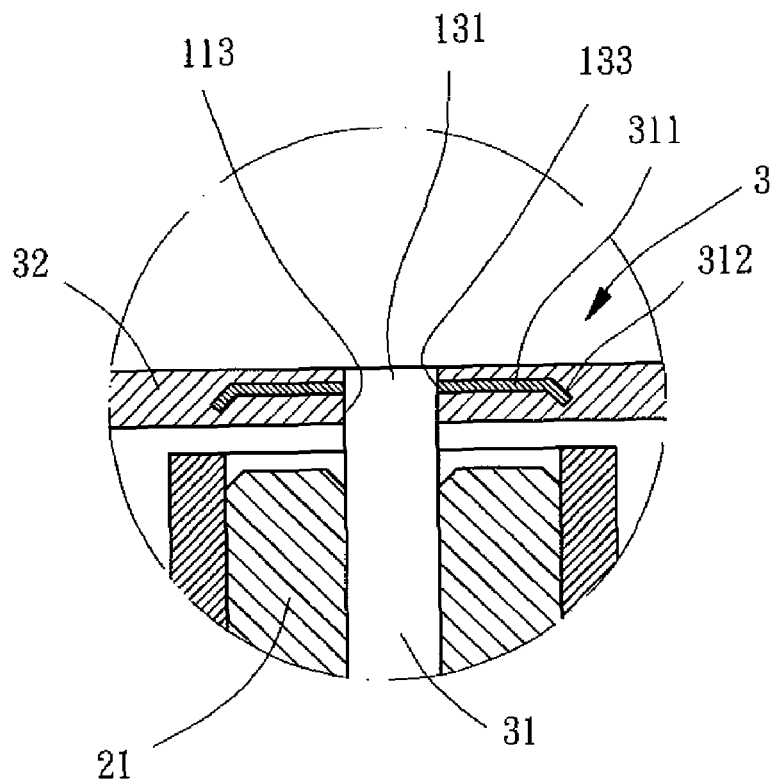
FIG. 6 an enlarged detailed cross sectional view illustrating where a shaft is fixed to a hub of a rotor in accordance with a second embodiment of the present invention.

FIG. 6 shows a rotor numbered 3 of a second embodiment according to the preferred teachings of the present invention. In comparison with the rotor 1 described in the first embodiment, the rotor 3 of this embodiment further includes a bent portion 312. Specifically, an outer edge of the extending member 311 extends downwards and away from the shaft 31 to form the bent portion 312. Optionally, the bent portion 312 can also be provided by the outer edge of the extending member 311 extending upwards and away from the shaft 31 (not illustrated). Namely, there is an obtuse angle between the bent portion 312 and a remaining portion of the extending member 311 other than the bent portion 312. Thus, a contact area between the extending member 311 and the hub 32 is increased, while an arrangement in extension of the extending member 311 is changed from 2-D to 3-D. Thus, adhesion of the extending member 311 to the hub 32 is enhanced when the connecting end 131 with the extending member 311 mounted around is fixed to the hub 32 by injection molding, so that a combination reliability of the hub 11 and the shaft 31 is improved.

Figure 7:
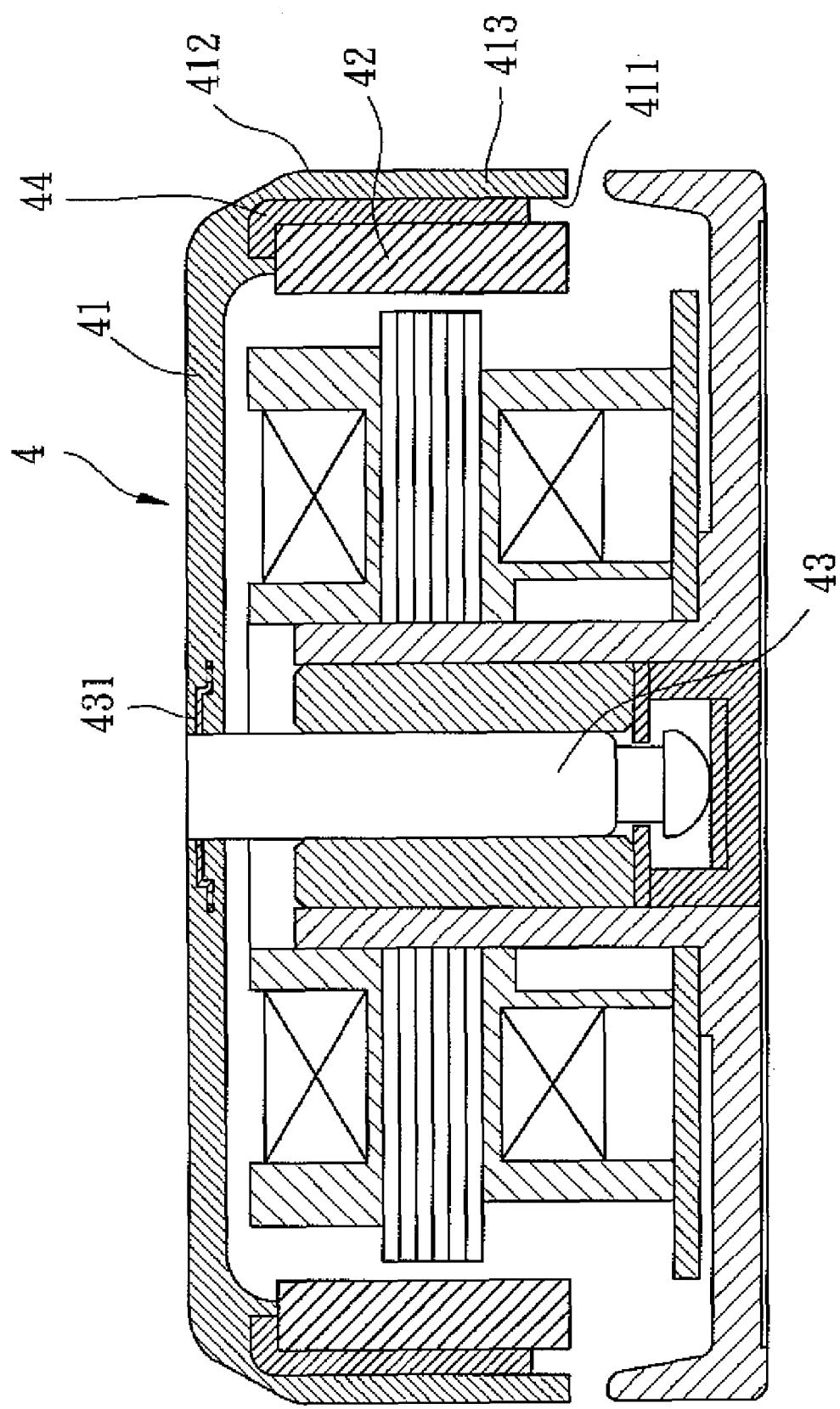
FIG. 7 is cross sectional view illustrating a rotor in accordance with a third embodiment of the present invention when the rotor is applied to a motor.

FIG. 7 shows a rotor designated as "4" of a third embodiment according to the preferred teachings of the present invention. The rotor 4 includes a hub 41, a permanent magnet 42 and a shaft 43 fixed to the hub 41. An outer edge of the hub 41 extends downwards to form an annular wall 413, with the annular wall 413 having an inner surface 411 facing the shaft 43, for the permanent magnet 42 to attach to, and having an outer surface 412. Also, there is an extending member 431 formed around the shaft 43. Besides, the rotor 4 can be applied to a motor with a radial air gap.

Figure 8:
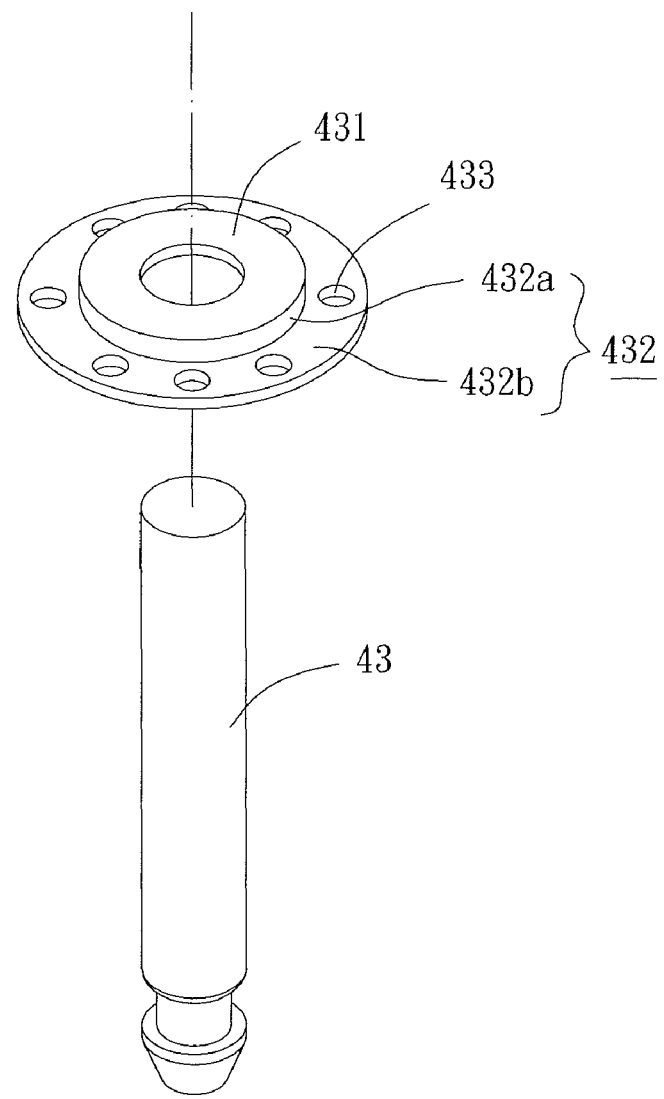
FIG. 8 is an exploded perspective view illustrating a shaft and an extending member of FIG. 7.
Figure 9:
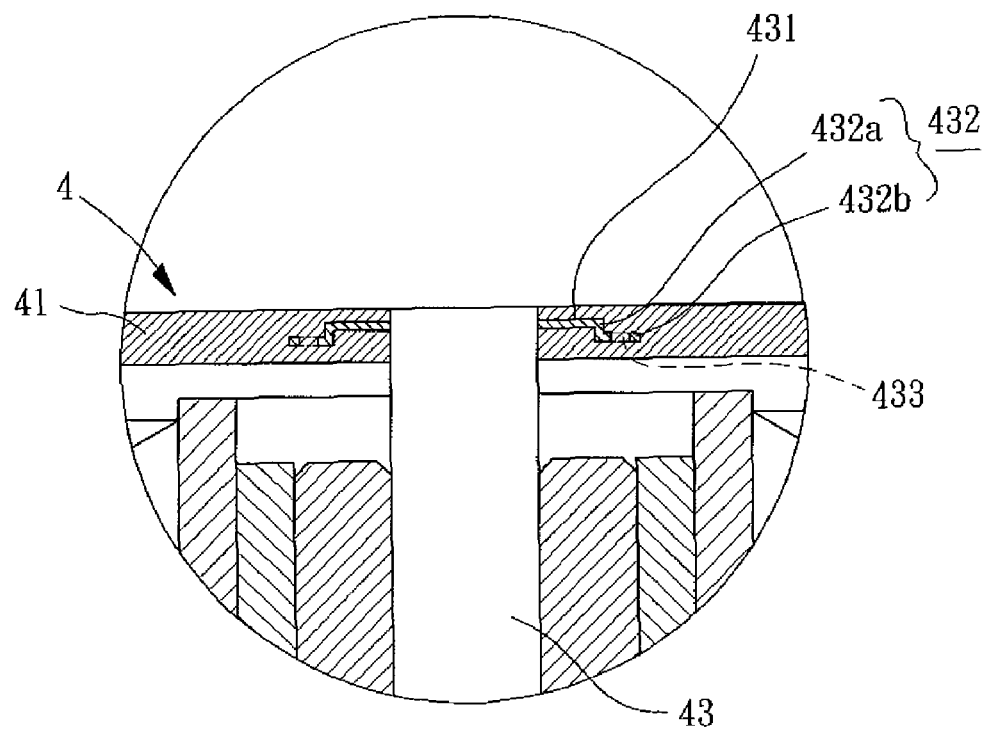
FIG. 9 an enlarged detailed cross sectional view illustrating where the shaft is fixed to a hub of FIG. 7.

Referring to FIGS. 7 to 9, an outer edge of the extending member 431 extends a bent portion 432 in the shape of a stair. Specifically, the bent portion 432 includes a first section 432a and a second section 432b, with said first and second sections 432a, 432b being outward and sequentially formed. Furthermore, the first section 432a is parallel to the shaft 43, and the second section 432b is perpendicular to the shaft 43. There is a plurality of through holes 433 passing through the extending member 431, and the through holes 433 are preferably located on the second section 432b of the bent portion 432. By configuration of the bent portion 432, when the shaft 43 is fixed to the hub 41 by injection molding, the through holes 433 are filled with material forming the hub 41 to enhance coupling strength. Hence, the hub 41 and the shaft 43 revolving relative to each other is avoided, and the hub 41 and the shaft 43 combine with each other more firmly.

Figure 10:
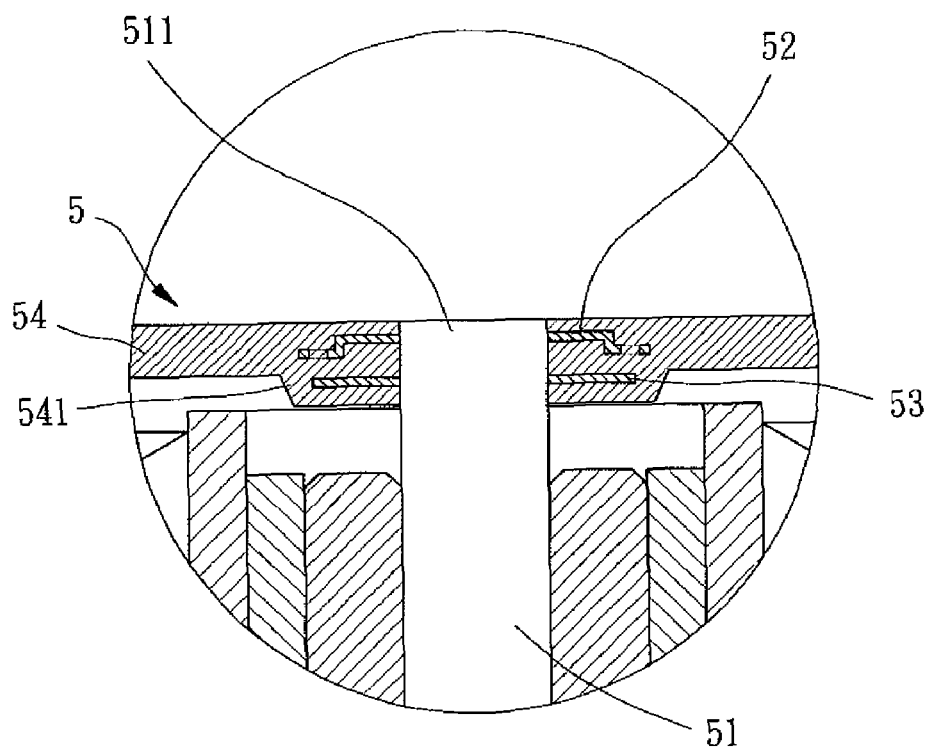
FIG. 10 an enlarged detailed cross sectional view illustrating where a shaft is fixed to a hub of a rotor in accordance with a fourth embodiment of the present invention.

FIG. 10 shows a rotor of a fourth embodiment according to the preferred teachings of the present invention, which is designated as "5". There are a first extending member 52 and a second extending member 53 mounted around the connecting end 511 of the shaft 51. In addition, the first extending member 52 is the same as the extending member 431 with the bent portion 432 of the third embodiment, and the second extending member 53 is identical to the extending member 132 of the first embodiment. A shaft seat 541 is formed on the center of and inside the hub 54 for receiving the connecting end 511 of the shaft 51. An axial height of a motor is not limited, with the first extending member 52 and the second extending member 53 being embedded in a wall of the shaft seat 541. By this arrangement, the hub 54 and the shaft 51 are combined together more securely to improve reliability of combination of the hub 54 and the shaft 51.

As has been discussed above, by the extending member 132, 311, 431, 52, 53 mounted around the shaft 13,31,43,51 and embedded in the wall of the hub 11, 41, 54, the contact area between the shaft 13, 31, 43, 51 and the hub 11, 41, 54 is increased to provide reliable combination of the shaft 13, 31, 43, 51 and the hub 11, 41, 54. Therefore, the shaft 13, 31, 43, 51 is fixed to the hub 11, 41, 54 securely enough to prevent disengagement from each other, even though the hub 11, 41, 54 is without a shaft seat for a shaft to mount fixedly. Also, the rotor 1, 3, 4, 5 can be used for meeting the need of minimizing dimensions of motors.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A rotor, comprising:
a hub having a wall including an inner surface and an outer surface, with an assembling hole formed in the inner surface and at a center of the inner surface;
a permanent magnet mounted on the inner surface of the hub;
a shaft having two ends with one end being a connecting end, with the connecting end fixed in the assembling hole of the hub, with an extending member arranged at the connecting end and engaging with and extending radially from a radial surface of the shaft, with the extending member embedded in the wall of the hub spaced from and intermediate the inner and outer surfaces, with the extending member extending radially outwardly of the assembling hole.

2. The rotor as defined in claim 1, wherein the extending member has a central hole, with the connecting end of the shaft partially passing through the central hole and fixedly attaching to a periphery of the central hole of the extending member.

3. The rotor as defined in claim 1, wherein the extending member is an annular plate mounted around the shaft.

4. The rotor as defined in claim 3, wherein an outer edge of the extending member extends away from the shaft to form a bent portion, with there being an obtuse angle between the bent portion and a remaining portion of the extending member other than the bent portion.

5. The rotor as defined in claim 4, wherein the outer edge of the extending member extends downwards and away from the shaft to form the bent portion.

6. The rotor as defined in claim 3, wherein from an outer edge of the extending member extends a bent portion in a shape of a stair while the bent portion includes a first section and a second section, with said first and second sections being outwards and sequentially formed.

7. The rotor as defined in claim 6, wherein the first section is parallel to the shaft and the second section is perpendicular to the shaft.

8. The rotor as defined in claim 1, further comprising: another extending member arranged at the connecting end of the shaft.

9. The rotor as defined in claim 4, further comprising: another extending member arranged at the connecting end of the shaft.

10. The rotor as defined in claim 6, further comprising: another extending member arranged at the connecting end of the shaft.

11. The rotor as defined in claim 1, further comprising: a plurality of through holes passing through the extending member.

12. The rotor as defined in claim 4, further comprising: a plurality of through holes passing through the extending member.

13. The rotor as defined in claim 7, further comprising: a plurality of through 5 holes passing through the second section of the bent portion.

14. The rotor as defined in claim 1, wherein the assembling hole passes through the hub to connect with the inner surface and the outer surface.

* * * * *